United States Patent
Engelhardt et al.

(10) Patent No.: US 6,958,858 B2
(45) Date of Patent: Oct. 25, 2005

(54) METHOD FOR SCANNING MICROSCOPY; AND SCANNING MICROSCOPE

(75) Inventors: Johann Engelhardt, Bad Schoenborn (DE); Juergen Hoffmann, Bad Camberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/207,334

(22) Filed: Jul. 29, 2002

(65) Prior Publication Data

US 2003/0021020 A1 Jan. 30, 2003

(30) Foreign Application Priority Data

Jul. 30, 2001 (DE) .......................................... 101 37 158

(51) Int. Cl.[7] .............................. G02B 21/06; G01J 3/30
(52) U.S. Cl. ................... 359/388; 356/317; 250/339.02
(58) Field of Search ................................ 359/381–389, 359/126, 165, 285, 125; 356/300–302, 308–319, 323–329; 250/339.02, 458.1, 459.1, 461.1, 234, 339.11, 461

(56) References Cited

U.S. PATENT DOCUMENTS

| | | | |
|---|---|---|---|
| 3,720,822 A | 3/1973 | Rochester et al. | ............ 240/1.3 |
| 4,367,926 A | * 1/1983 | Hohki | ......................... 359/310 |
| 4,606,641 A | 8/1986 | Yamada et al. | ............. 356/369 |

(Continued)

FOREIGN PATENT DOCUMENTS

| | | |
|---|---|---|
| DE | 4343490 | 6/1995 |
| DE | 19827140 | 12/1999 |
| DE | 19906757 | 12/1999 |
| DE | 19859314 | 1/2000 |
| DE | 19853669 | 11/2000 |
| DE | 19944355 | 3/2001 |
| WO | 9517662 | 6/1995 |
| WO | 0004613 | 1/2000 |

OTHER PUBLICATIONS

T.A. Birks et al., "Supercontinuum Generation in Tapered Fibers", vol. 25, No. 19 / Optics Letters, pp. 1415–1417, Oct. 1, 2000, Optical Society of America.

U.S. Appl. No. 09/881,062, filed Jun. 15, 2001, Birk et al., entitled "Arrangement for Examining Microscopic Preparations with a Scanning Microscope; and Illumination Device for a Scanning Microscope".

*Primary Examiner*—Gregory J. Toatley, Jr.
*Assistant Examiner*—Sang H. Nguyen
(74) *Attorney, Agent, or Firm*—Davidson, Davidson & Kappel, LLC

(57) ABSTRACT

A method for scanning microscopy is disclosed. It contains the step of generating an illuminating light beam that exhibits at least a first substantially continuous wavelength spectrum whose spectral width is greater than 5 nm; the choosing of a second wavelength spectrum that is arranged spectrally within the first wavelength spectrum; the step of selecting the light of the second wavelength spectrum out of the illuminating light beam using an acoustooptical component; and the step of illuminating a specimen with the illuminating light beam. A scanning microscope is also disclosed.

20 Claims, 2 Drawing Sheets

U.S. PATENT DOCUMENTS

| | | | | |
|---|---|---|---|---|
| 4,827,125 A | * | 5/1989 | Goldstein | 250/234 |
| 4,856,893 A | * | 8/1989 | Breen | 356/5.09 |
| 4,861,158 A | * | 8/1989 | Breen | 356/5.09 |
| 4,883,963 A | * | 11/1989 | Kemeny et al. | 250/339.11 |
| 5,043,965 A | * | 8/1991 | Iida et al. | 369/44.13 |
| 5,235,452 A | * | 8/1993 | Auffret et al. | 398/196 |
| 5,377,003 A | * | 12/1994 | Lewis et al. | 356/300 |
| 5,410,371 A | * | 4/1995 | Lambert | 348/769 |
| 5,578,818 A | | 11/1996 | Kain et al. | 250/234 |
| 5,680,386 A | * | 10/1997 | Le Carvennec et al. | 369/116 |
| 6,097,870 A | | 8/2000 | Ranka et al. | 385/127 |
| 6,128,077 A | * | 10/2000 | Jovin et al. | 356/310 |
| 6,154,310 A | | 11/2000 | Galvanauskas et al. | 359/328 |
| 6,292,310 B1 | * | 9/2001 | Chao | 359/813 |
| 6,300,639 B1 | * | 10/2001 | Wiederhoeft | 250/458.1 |
| 6,525,812 B1 | | 2/2003 | Hartmann et al. | 356/318 |
| 6,567,164 B2 | * | 5/2003 | Birk et al. | 356/317 |
| 6,614,525 B1 | * | 9/2003 | Engelhardt et al. | 356/318 |
| 2002/0006264 A1 | | 1/2002 | Birk et al. | 385/147 |
| 2002/0009260 A1 | | 1/2002 | Birk et al. | 385/33 |
| 2002/0018290 A1 | | 2/2002 | Birk et al. | 359/368 |
| 2002/0028044 A1 | | 3/2002 | Birk et al. | 385/43 |
| 2002/0043622 A1 | | 4/2002 | Birk et al. | 250/306 |
| 2002/0050564 A1 | | 5/2002 | Birk et al. | 250/306 |
| 2002/0018293 A1 | | 3/2004 | Birk et al. | 359/385 |

* cited by examiner

METHOD FOR SCANNING MICROSCOPY; AND SCANNING MICROSCOPE

CROSS REFERENCE TO RELATED APPLICATIONS

This application claims priority of the German patent application 101 37 158.6 which is incorporated by reference herein.

FIELD OF THE INVENTION

The invention concerns a method for scanning microscopy. The invention furthermore concerns a scanning microscope and a confocal scanning microscope

BACKGROUND OF THE INVENTION

In scanning microscopy, a specimen is illuminated with a light beam in order to observe the detected light, constituting reflected or fluorescent light, emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position. The illuminating light is coupled in via a beam splitter. The fluorescent or reflected light coming from the specimen passes through the beam splitter and then arrives at the detectors. In confocal scanning microscopy in particular, a specimen is scanned in three dimensions with the focus of a light beam.

A confocal scanning microscope generally comprises a light source, a focusing optical system with which the light of the source is focused onto an pinhole (called the "excitation pinhole), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels by way of the beam deflection device back to the beam splitter, passes through it, and is then focused onto the detection pinhole behind which the detectors are located. This detection arrangement is called a "descan" arrangement. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers.

The published German Patent Application DE 198 27 140 A1 discloses a laser scanning microscope having an AOTF in the laser coupling-in beam path for line selection and in order to attenuate laser lines.

The published German Patent Application DE 199 06 757 A1 discloses an optical arrangement in the beam path of a light source suitable for fluorescent excitation, preferably in the beam path of a confocal laser scanning microscope, having at least one spectrally selective element for coupling the excitation light of at least one light source into the microscope and for blocking the excitation light scattered and reflected at the specimen, or the excitation wavelength, out of the light coming from the specimen via the detection beam path. For variable configuration with a very simple design, the arrangement is characterized in that excitation light of a differing wavelength can be blocked out by means of the spectrally selective element. Alternatively, an optical arrangement of this kind is characterized in that the spectrally selective element can be set to the excitation wavelength that is to be blocked out. Also stated in the aforementioned document is the fact that the spectrally selective element can be embodied as an acoustooptical tunable filter (AOTF) or an acoustooptical deflector (AOD).

The published German Patent Application DE 198 59 314 A1 discloses an arrangement of a light-diffracting element for the separation of excitation light and emitted light in a microscope beam path, preferably in a confocal microscope, and in particular in a laser scanning microscope, in which context both the excitation light and the emitted light pass through the light-diffracting element and at least one wavelength of the excitationlight is affected by diffraction, while other wavelengths emitted by the specimen pass through the element unaffected and are thereby spatially separated from the excitation light. The arrangement contains an AOTF whose low bandwidth of approx. 2 nm is presented as a particular advantage.

The published German Patent Application DE 198 53 669 A1 discloses an ultrashort pulse source having a controllable multiple-wavelength output, which is utilized in particular in a multi-photon microscope. The system comprises an ultrashort pulsed laser for generating ultrashort optical pulses of a fixed wavelength, and at least one wavelength conversion channel.

U.S. Pat. No. 6,097,870 discloses an arrangement for generating a broadband spectrum in the visible and infrared spectral region. The arrangement is based on a microstructured fiber into which the light of a pump laser is coupled. In the microstructured fiber, the pump light is broadened as a result of nonlinear effects. "Photonic band-gap material" or "photonic crystal fibers," "holey fibers," or "microstructured fibers" are also used as the microstructured fiber. Embodiments as a "hollow fiber" are also known.

A further arrangement for generating a broadband spectrum is disclosed in the publication of Birks et al., "Super-continuum generation in tapered fibers," Opt. Lett. Vol. 25, p. 1415 (2000). A conventional light-guiding fiber having a fiber core that exhibits a taper at least along a portion is used in the arrangement. Light-guiding fibers of this kind are known as "tapered fibers."

The PCT application having the publication number WO 00/04613 discloses an optical amplifier whose gain is adjustable as a function of wavelength. Also disclosed in the aforesaid publication is a fiber light source based on this principle.

Arc lamps are known as broadband light sources, and are used in many sectors. One example that may be mentioned here is U.S. Pat. No. 3,720,822 "Xenon photography light," which discloses a xenon arc lamp for illumination in photography.

In microscopy in particular, spectrally broadband light sources with high light density are important for the illumination of microscopic preparations. These sources can be used flexibly, however, only if illuminating light of the desired wavelength or wavelength spectrum can be easily and flexibly selected out of the emission spectra of the light sources. Arrangements having fixed color filters or dichroic filters do not offer sufficient universality, and are complex and cumbersome in terms of handling. Arrangements having acoustooptical components offer a flexible selection only of a few narrow lines, also offering insufficient flexibility because the lines are arranged serially. The same disadvantages exist in the context of selecting universal wavelengths or wavelength regions of the detected light.

SUMMARY OF THE INVENTION

It is therefore the object of the invention to describe a method for scanning microscopy that makes possible individual spectral adaptability of the illuminating light to the properties of the specimen.

This object is achieved by way of a method for scanning microscopy comprising the steps of:
generating an illuminating light beam that exhibits at least a first substantially continuous wavelength spectrum whose spectral width is greater than 5 nm;
choosing a second wavelength spectrum that is arranged spectrally within the first wavelength spectrum;
selecting the light of the second wavelength spectrum out of the illuminating light beam using an acoustooptical component; and
illuminating a specimen with the illuminating light beam.

A further object of the invention is to propose a scanning microscope, that makes possible a spectrally universal and flexible illumination, in particular with spectrally broadband illuminating light.

The above object is achieved by way of a scanning microscope comprising: a light source that generates an illuminating light beam, for illumination of a specimen, which exhibits at least a first continuous wavelength spectrum whose spectral width is greater than 5 nm, having a detector that detects a detected light beam proceeding from the specimen, and having an acoustooptical component with which light of a second wavelength spectrum that is arranged spectrally within the first wavelength spectrum can be selected out of the illuminating light beam.

An other object of the invention is to disclose a confocal scanning microscope with a spectrally universal and flexible illumination.

This object is achieved by a confocal scanning microscope comprising: a light source that generates an illuminating light beam, for illumination of a specimen, which exhibits at least a first continuous wavelength spectrum whose spectral width is greater than 5 nm, having a detector that detects a detected light beam proceeding from the specimen, and having an acoustooptical component with which light of a second wavelength spectrum that is arranged spectrally within the first wavelength spectrum can be selected out of the illuminating light beam.

The invention has the advantage of universal variation of the power level of the illuminating light of at least one arbitrarily selectable wavelength or at least one arbitrarily selectable wavelength region, in both fluorescence-microscopy and reflection-microscopy applications.

The method according to the present invention preferably contains the additional step of detecting a detected light beam proceeding from the specimen, and the additional steps of choosing a third wavelength spectrum and selecting the light of the third wavelength spectrum out of the detected light beam using the acoustooptical component.

The acoustooptical component is preferably configured as an acoustooptical tunable filter (AOTF), an acoustooptical deflector (AOD), or an acoustooptical modulator (AOM). It is activated with an electromagnetic high-frequency wave that has an adjustable HF spectrum, the second wavelength spectrum being adjustable by varying the shape of the HF spectrum. The term "wavelength spectrum" means the dependence of the power level of the illuminating or detected light beam on the light wavelength, or the dependence of the HF wave on the wavelength of the HF wave. The term "shape" means the shape of the graph resulting from a plot of power level against wavelength.

The scanning microscope according to the present invention contains a light source that generates an illuminating light beam, for illumination of a specimen, that exhibits at least a first continuous or quasi-continuous wavelength spectrum whose spectral width is greater than 5 nm. The light source preferably contains a microstructured optical element, for example made of photonic band gap material, or a light guide having a cross-sectional taper (tapered fiber); and a pulsed laser that illuminates the microstructured optical element. In another variant embodiment, a short-pulse laser is provided as the light source.

An embodiment that comprises operating elements for adjusting the spectral composition of the wavelength spectrum is particularly advantageous. These parameters are adjusted on a control panel or on a PC, and the adjustment data are transferred in the form of electromagnetic signals to the high-frequency source, which generates an electromagnetic high-frequency wave that exhibits the HF spectrum. Transfer of the electromagnetic high-frequency wave is accomplished via a coaxial cable. Adjustment by way of sliders, which are displayed on a display and operated, for example, with a computer mouse, is particularly intuitive.

In another variant of the scanning microscope, the detected light beam passes through the acoustooptical component, and the light of an adjustable third wavelength spectrum can be selected out of the detected light beam. For that purpose, the acoustooptical component is activated with an HF wave that exhibits an HF wavelength spectrum corresponding to the third wavelength spectrum.

In a very particularly preferred embodiment, the scanning microscope is a confocal scanning microscope.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
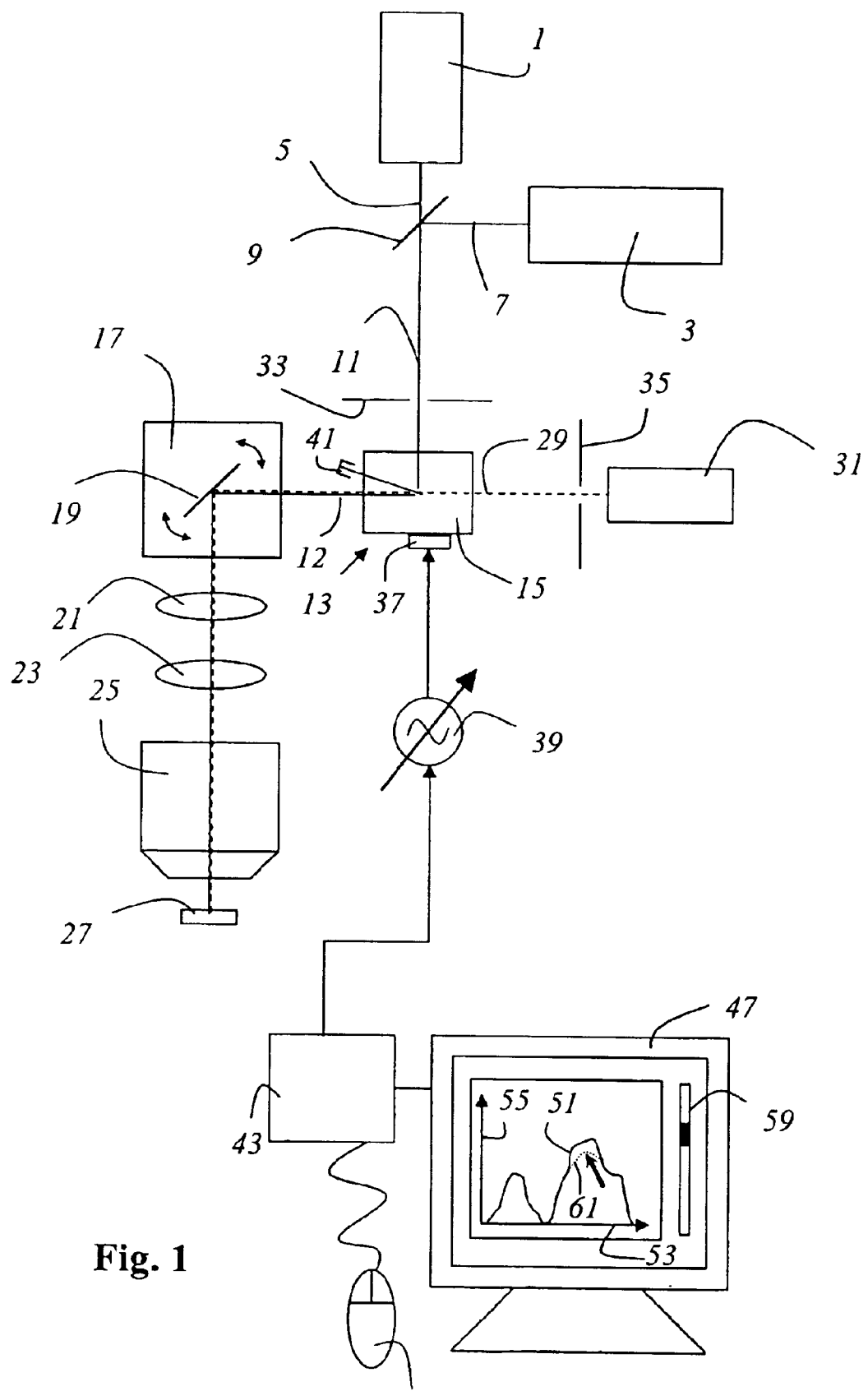
FIG. 1 shows a scanning microscope according to the present invention.

FIG. 1 shows a scanning microscope according to the present invention that is embodied as a confocal scanning microscope, having two lasers 1, 3 whose emitted light beams 5, 7, which are of different wavelengths, are combined with dicbroic beam combiner 9 into one illuminating light beam 11. The scanning microscope comprises an acoustooptical component 13 that is embodied as AOTF 15. From acoustooptical component 13, light 12, selected out of illuminating light beam 11, arrives at a beam deflection device 17 that contains a gimbal-mounted scanning mirror 19 and that guides illuminating light beam 11 through scanning optical system 21, tube optical system 23, and objective 25 over or through specimen 27. Detected light beam 29 coming from the specimen travels in the opposite direction through scanning optical system 21, tube optical system 23, and objective 25, and arrives via scanning mirror 19 at acoustooptical component 13 which conveys detected light beam 29 to detector 31, which is embodied as a multi-band detector. Illuminating light beam 11 is depicted as a solid line in the drawing, and detected light beam 29 as a dashed line. Illumination pinhole 33 and detection pinhole 35 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art. Acoustooptical component 13, which serves to select the wavelength spectrum that is chosen, is configured as AOTF 15, through which an acoustic wave passes. The acoustic wave is generated by an electrically activated piezoacoustic generator 37. Activation is accomplished by a high-frequency source 39 that generates an electromagnetic high-frequency wave that exhibits an adjustable HF spectrum. The HF spectrum is chosen in such a way that only those portions of illuminating light beam 11 having the desired wavelength arrive at beam deflection device 17. The other portions of illuminating light beam 11 not influenced by the acoustic excitation are directed into a beam trap 41. The power level of the illuminating light beam 11 can be selected by varying the amplitude of the acoustic wave. The crystal sectioning and orientation of acoustooptical component 13 are selected in such a way that with a single coupling-in direction, different wavelengths are deflected in the same direction. A computer 43 is used to choose a second or third wavelength spectrum. Monitor 47 of computer 43 serves as the display for the spectral composition. Selection of the wavelength spectrum together with its spectral composition is accomplished on the basis of a graph 51 within a coordinate system having two coordinate axes 53, 55. The wavelength of the light is plotted on coordinate axis 53, and its power level on coordinate axis 55. Computer 43 controls high-frequency source 39 in accordance with the user's stipulation. The user makes adjustments using computer mouse 57. Depicted on monitor 47 is a slider 59 that serves for adjustment of the overall light power level of illuminating light beam 11 or detected light beam 29. Clicking on graph 51 while simultaneously moving computer mouse 57 generates a dashed-line graph 61 that can be shaped in accordance with the motion of computer mouse 57. At the moment when another click is performed with computer mouse 57, high-frequency source 39 is activated via computer 43 so as to yield the wavelength spectrum preselected with dashed-line graph 61.

Figure 2:
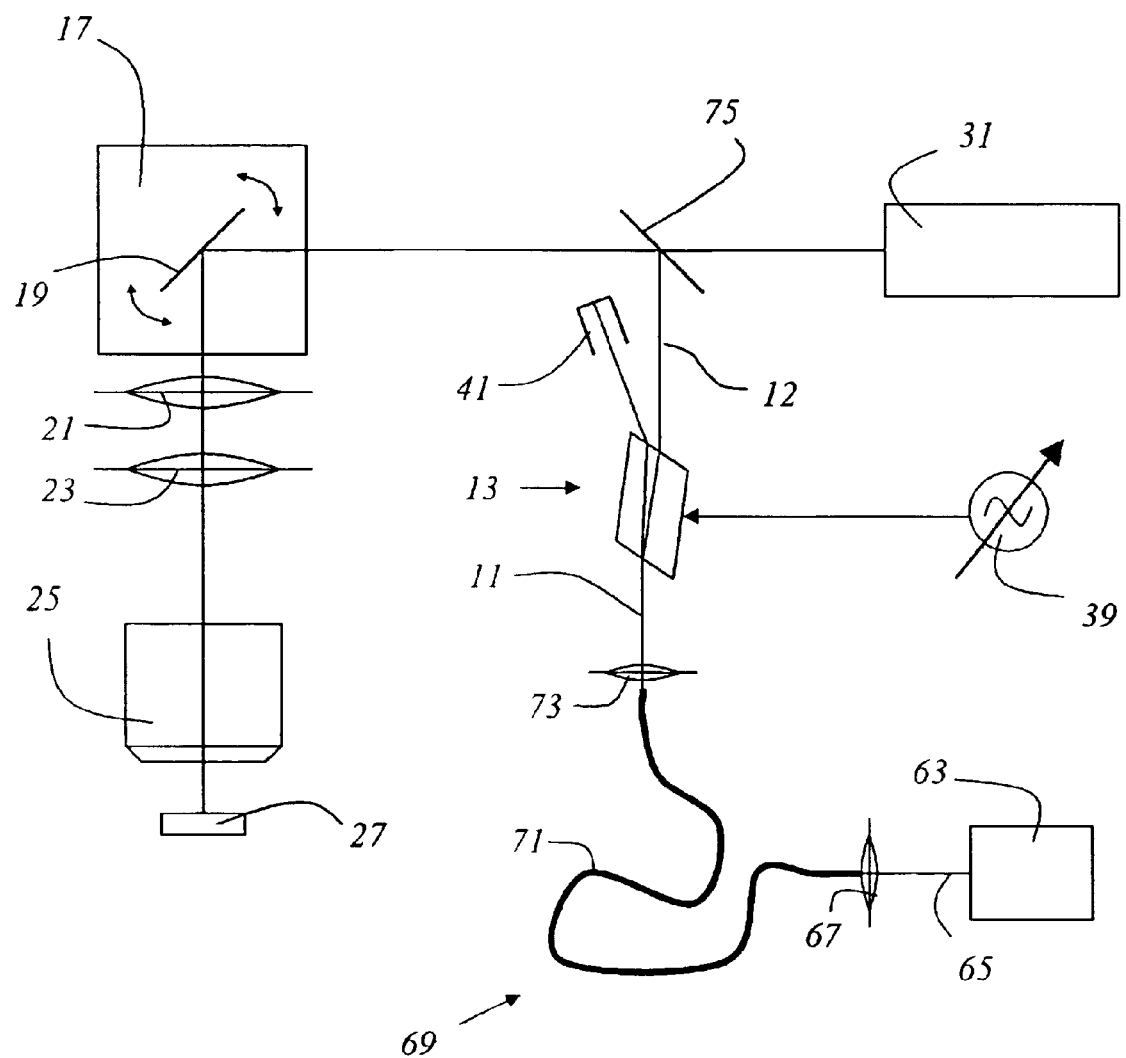
FIG. 2 shows a further scanning microscope according to the present invention.

FIG. 2 shows a confocal scanning microscope. A titanium-sapphire pulsed laser 63, whose emitted light 65 is coupled with an optical system 67 into a microstructured optical element 69 which spectrally broadens emitted light 65, serves as the light source. Microstructured optical element 69 comprises a light guide having a cross-sectional taper 71. Illuminating light beam 11 that is coupled out of microstructured optical element 69 with a further optical system 73 travels via an acoustooptical element 13 that is embodied as AOTF 15, and via main beam splitter 75, to beam deflection device 17, which guides light 12, selected out of illuminating light beam 11, through scanning optical system 21, tube optical system 23, and objective 25 over the specimen. The detected light travels to detector 31, which is embodied as a multi-band detector. Illuminating light beam 11 has a first wavelength spectrum. The choosing of a second wavelength spectrum and selection of the light 12 of the second wavelength spectrum out of the illuminating light beam using an acoustooptical component 13, and adjustment of the second wavelength spectrum of the illuminating light beam, occur similarly to the case of the scanning microscope depicted in FIG. 1.

The invention has been described with reference to a particular exemplary embodiment. It is nevertheless self-evident that changes and modifications can be made without thereby leaving the range of protection of the claims below.

What is claimed is:

1. A method for scanning microscopy comprising the steps of:

generating an illuminating light beam that exhibits at least a first substantially continuous wavelength spectrum whose spectral width is greater than 5 nm;

choosing a second substantially continuous wavelength spectrum that is arranged spectrally within the first wavelength spectrum;

selecting light of the second wavelength spectrum out of the illuminating light beam using an acoustooptical component; and scanning a specimen with the light of the second wavelength spectrum.

2. The method as defined in claim 1, comprising the further step of:

detecting a detected light beam proceeding from the specimen.

3. The method as defined in claim 2, characterized by the further steps of:

choosing a third wavelength spectrum; and selecting the light of the third wavelength spectrum out of the detected light beam using the acoustooptical component.

4. The method as defined in claim 1, wherein the acoustooptical component is an acoustooptical tunable filter (AOTF) or an acoustooptical deflector (AOD) or an acoustooptical modulator (AOM).

5. The method as defined in claim 1, wherein the acoustooptical component is activated with an electromagnetic high-frequency wave.

6. The method as defined in claim 5, wherein the electromagnetic high-frequency wave has an adjustable HF spectrum.

7. The method as defined in claim 6, characterized by the further step of:

adjusting the shape of the second wavelength spectrum by varying the shape of the HF spectrum.

8. A scanning microscope comprising: a light source that generates an illuminating light beam, for illumination of a specimen, which exhibits at least a first continuous wavelength spectrum whose spectral width is greater than 5 nm, having a detector that detects a detected light beam proceeding from the specimen, having an acoustooptical component with which light of a second substantially continuous wavelength spectrum that is arranged spectrally within the first wavelength spectrum can be selected out of the illuminating light beam, and having a scanning device configured to scan the specimen with the light of the second wavelength spectrum.

9. The scanning microscope as defined in claim 8, wherein the acoustooptical component is an acoustooptical tunable filter (AOTF) or an acoustooptical deflector (AOD) or an acoustooptical modulator (AOM).

10. The scanning microscope as defined in claim 8 further comprising a high-frequency source which generates an electromagnetic high-frequency wave, exhibiting an HF spectrum, with which the acoustooptical component can be activated via a piezoacoustic generator.

11. The scanning microscope as defined in claim 10, wherein the HF spectrum of the electromagnetic high-frequency wave is adjustable.

12. The scanning microscope as defined in claim 10, wherein the shape of the second wavelength spectrum is adjustable by varying the shape of the HF spectrum.

13. The scanning microscope as defined in claim 8, wherein the detected light beam passes through the acoustooptical component, and the light of an adjustable third wavelength spectrum can be selected out of the detected light beam.

14. The scanning microscope as defined in claim 8, wherein the light source comprises a pulsed laser.

15. The scanning microscope as defined in claim 8, wherein the light source comprises at least one microstructured optical element.

16. The scanning microscope as defined in claim 15, wherein the microstructured optical element comprises photonic band gap material or a light guide having a cross-sectional taper.

17. A confocal scanning microscope comprising: a light source that generates an illuminating light beam, for illumination of a specimen, which exhibits at least a first continuous wavelength spectrum whose spectral width is greater than 5 nm, having a detector that detects a detected light beam proceeding from the specimen, having an acoustooptical component with which light of a second substantially continuous wavelength spectrum that is arranged spectrally within the first wavelength spectrum can be selected out of the illuminating light beam, and having a scanning device configured to scan the specimen with the light of the second wavelength spectrum.

18. The confocal scanning microscope as defined in claim 17 further comprising a high-frequency source which generates an electromagnetic high-frequency wave, exhibiting an HF spectrum, with which the acoustooptical component can be activated via a piezoacoustic generator.

19. The confocal scanning microscope as defined in claim 18, wherein the shape of the second wavelength spectrum is adjustable by varying the shape of the HF spectrum.

20. The confocal scanning microscope as defined in claim 17, wherein the light source comprises at least one microstructured optical element.

\* \* \* \* \*